Jan. 27, 1959   J. F. NAYLOR ET AL   2,870,898
APPARATUS FOR CONVEYING SHEETS OF FRAGILE MATERIAL
Filed June 16, 1954
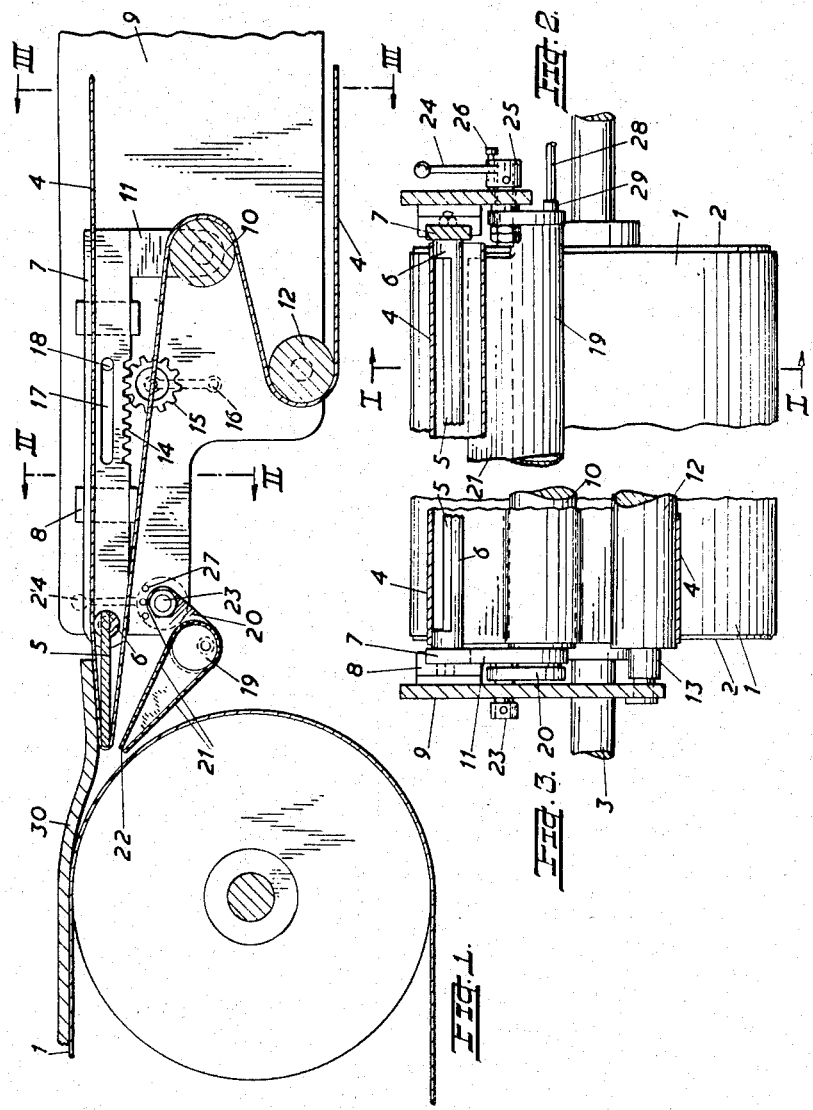
JOSEPH FRANCIS NAYLOR
ROBERT LESLIE LARGE
Inventors

United States Patent Office 2,870,898
Patented Jan. 27, 1959

2,870,898

APPARATUS FOR CONVEYING SHEETS OF FRAGILE MATERIAL

Joseph Francis Naylor and Robert Leslie Large, Newton-le-Willows, England, assignors to T. & T. Vicars Limited, Newton-le-Willows, England, a British company Application June 16, 1954, Serial No. 437,171

Claims priority, application Great Britain June 18, 1953

2 Claims. (Cl. 198—20)

The present invention relates to the conveyance of fragile baked confection in sheet form, such as sponge cake, and is concerned particularly with its transfer from a first conveyor to a second conveyor.

In the baking industry, certain products, such as sponge cake, are produced in a continuous sheet. For the production of this class of goods, batter or the like material is deposited in a continuous stream upon the surface of an endless metal band conveyor which carries the batter or like material through the baking oven. The sheet of batter or like material formed on the conveyor is completely baked during its passage through the baking chamber of the oven and eventually arrives as a baked sheet at a point where it must be detached from the oven sole or band conveyor and transformed to a cooling conveyor.

A known method of detaching the baked sheet is by flexible steel fingers of various formation resting upon the band conveyor to strip the baked sheet therefrom and further to guide it to the receiving conveyor. Frequently, such fingers scrape off grease on the underside of the baked sheet and on the surface of the band conveyor, causing accumulation of grease on the fingers, with the result that the underside of the baked sheet is marked or damaged.

An object of the present invention is to provide a method and apparatus which will eliminate the use of detaching fingers or the like mechanical means.

According to the present invention, a continuous sheet of baked confection, such as sponge cake, is detached from the surface of the endless metal band conveyor on which it is baked by means of an air stream directed against the under surface of the said sheet where the band conveyor changes direction about a guide means, the air stream being further effective to restrain the sheet against undue bending after detachment.

In a preferred extension of this method, a sheet of fragile material, such as baked confection in sheet form, is received from a first conveyor on to a receiving conveyor by positioning the receiving edge of the receiving conveyor in close parallel proximity to the terminal edge of the first conveyor, directing air under pressure into a bight formed between the two said edges and, when the material has been received on the receiving conveyor, withdrawing the said receiving edge to a position well clear of the said terminal edge.

In an apparatus suitable for carrying out the method of the invention, there is provided ejection means for air under pressure so constructed, and arranged in relation to the terminal end of the first conveyor, as to apply to the under surface of the baked sheet at the terminal end of the first conveyor a uniformly distributed current of air over the full width of the sheet supported thereon and of such force as to cause detachment of the sheet from the surface of the first conveyor. An appropriately directed convergent nozzle, or a plurality of such nozzles, may be used for this purpose.

Further description will be given by way of example with reference to the accompanying drawing showing a conveyor system adapted to a performance of the invention, in which:

Figure 1 is a sectional view taken on the line I—I of Figure 2 of a first conveyor and a second conveyor, the latter being positioned to receive from the former;

Figure 2 is a part end view taken on the line II—II of Figure 1; and

Figure 3 is also a part end view taken on the line III—III of Figure 1.

A first conveyor band 1, which in the example illustrated is in fact the oven band, is lapped about a guide drum 2 on a shaft 3 which is journalled for rotation in a frame (not shown).

A second conveyor band 4, which is the receiving conveyor band, has an upper run substantially in the same plane as that of the band and is lapped about a blade 5 mounted on a flat machined in a circular bar 6. The circular bar 6 is bolted at either end to respective arms 7 extending in the opposite direction to and substantially in line with the blade 5 and each guided slideably in guide blocks 8 which are mounted on the inwardly facing surfaces of laterally spaced side walls 9 of a frame supporting the receiving conveyor band. The lower run of the receiving conveyor band 4 is also lapped about a jockey pulley 10, this jockey pulley being carried rotatably between downwardly projecting limbs 11 of the arms 7, and the said lower run continues further about a guide roller 12 on a shaft 13 mounted for rotation in the side walls 9.

It will be evident that the blade 5 may be moved backwards and forwards substantially in its own plane to alter the position of the receiving edge of the receiving conveyor band 4 relative to the oven band 1, and as a simple means of effecting such adjustment, there is provided on one of the arms 7 (the arm seen in Figure 1) a rack 14 which is in mesh with a toothed wheel 15 mounted in the associated side wall 9 for rotation by a handle 16. By rotating this handle 16, the arms 7 may be moved, and for the purpose of limiting this movement within predetermined desired limits, a slot 17 is cut in the arm 7 seen in Figure 1, and into this slot projects a stop pin 18 fixed to the side wall 9. It will further be appreciated that as the arms 7 are moved to adjust the position of the receiving edge of the conveyor band 4, the correct driving tension of this band will be maintained by the provision of the jockey pulley 10 which is movable with the arms 7.

A circular air duct 19 extends transversely between the two side walls 9, being carried by crank arms 20 fixed to the duct at each end. A reduction piece formed by walls 21 converging to define a slit air outlet opening or nozzle 22 extends over substantially the whole length of the air duct 19. The arms 20 are fixed to spindles 23 rotatable in the side walls 9, and also fixed to one of these spindles, i. e. the one shown in Figure 1, is a handle 24 whose boss 25 has a spring loaded pin 26 engageable in corresponding holes 27 in the outer face of the associated side wall 9, thereby enabling angular adjustment of the air duct 19. It should be understood that any appropriate means to fix the adjusted position of the air duct 19 may be employed, and it may well be that a setting within finer limits than those possible in the form of construction shown may be desirable. A compressed air supply pipe 28 is seen to be connected at 29 with the air duct 19, this pipe leading to a source of compressed air.

As the leading edge of a continuous sheet 30 of sponge cake, for example, carried forward by the oven band 1 approaches the receiving conveyor band 4, the receiving edge of the latter is set closely proximate to the oven band in the position seen in Figure 1 and air is blown through the nozzle 22 into the bight between the two bands. The air so directed acts to detach the sheet from the oven band, to which the sheet tends to adhere, where this begins to turn downwardly about the drum 2 and when the leading edge has been taken on to the receiving band 4 the receiving edge thereof defined by the blade 5 may be withdrawn up to the limit imposed by the pin and slot 18, 17 by turning the handle 16. The blowing of air into the space between the bands may be continued, possibly at reduced rate, dependent upon the nature of the sheet material being conveyed for the purpose of avoiding undue bending.

It will be appreciated that the class of goods to which this invention is applicable, namely baked confection in sheet form, may possess some degree of flexibility, as in the case of sponge cake, whilst still being considered fragile. Thus, whether the first or oven conveyor band and the receiving conveyor band are arranged to cause a drop in height of the sheet passing from the first mentioned to the second mentioned, or whether the sheet is passed in a single plane continuously, depends on the inherent nature of the material of the sheet if damage is to be avoided in the course of conveyance.

We claim:

1. In a conveyor system for sheets of fragile baked confection, such as sponge cake, including a receiver conveyor band and a second conveyor band, said receiver conveyor band being lapped about adjustable guide means to form a receiving edge positioned adjacent said second conveyor band in the region of a downward turn thereof, pressure air ejection means adapted to direct air upwardly between said receiving edge and said second conveyor band, stop means in cooperating relationship with said guide means to define a first position of said receiving edge closely proximate to said second conveyor band and a second position of said receiving edge well clear of said second conveyor band, and means for the selective adjustment of said guide means to either one of said positions.

2. In a conveyor system for sheets of fragile baked confection, such as sponge cake, including a receiver conveyor band and a second conveyor band with the respective upper runs substantially coplanar, said receiver conveyor band being lapped about adjustable guide means to form a receiving edge positioned adjacent said second conveyor band in the region of a downward turn thereof, upwardly directed pressure air ejection means extending below said receiving edge over the width of the sheet receiving surface of said receiver conveyor band and adapted to pass air between the two said conveyor bands uniformly along said width, and means for the selective adjustment of said guide means to either one of two positions disposed in a plane substantially parallel to the plane of the upper runs of the two said conveyors, a first position in which said receiving edge is closely proximate to said second conveyor band and a second position in which said receiving edge is well clear of said second conveyor band.

References Cited in the file of this patent
UNITED STATES PATENTS

| | | |
|---|---|---|
| 1,049,435 | Wood | Jan. 7, 1913 |
| 1,957,260 | Gayler | May 1, 1934 |
| 2,168,419 | Paterson | Aug. 8, 1939 |
| 2,377,123 | Ballamy et al. | May 29, 1945 |
| 2,661,707 | Clement | Dec. 8, 1953 |